Feb. 3, 1953
A. J. McCLUSKEY
2,627,287
PORTABLE POWER SAW GUIDE WITH AN
ADJUSTABLE AND TILTABLE PLATFORM
Filed Feb. 6, 1950
2 SHEETS—SHEET 1
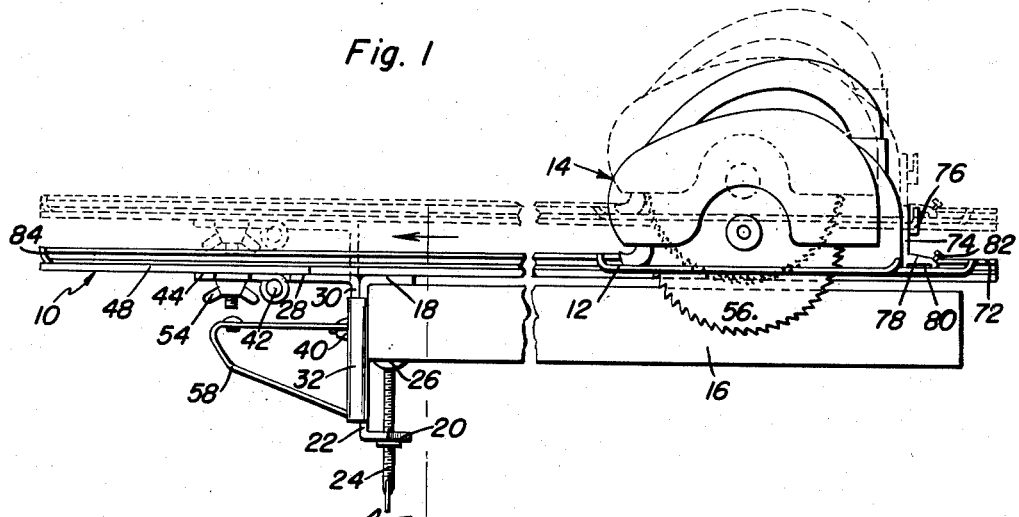
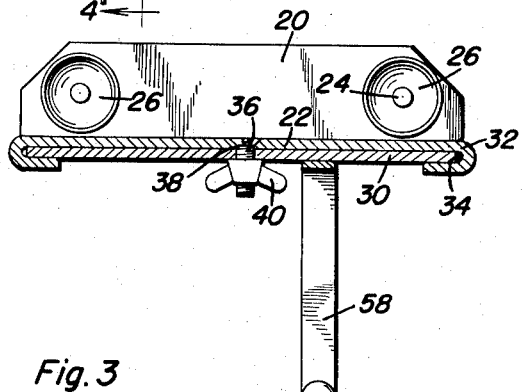
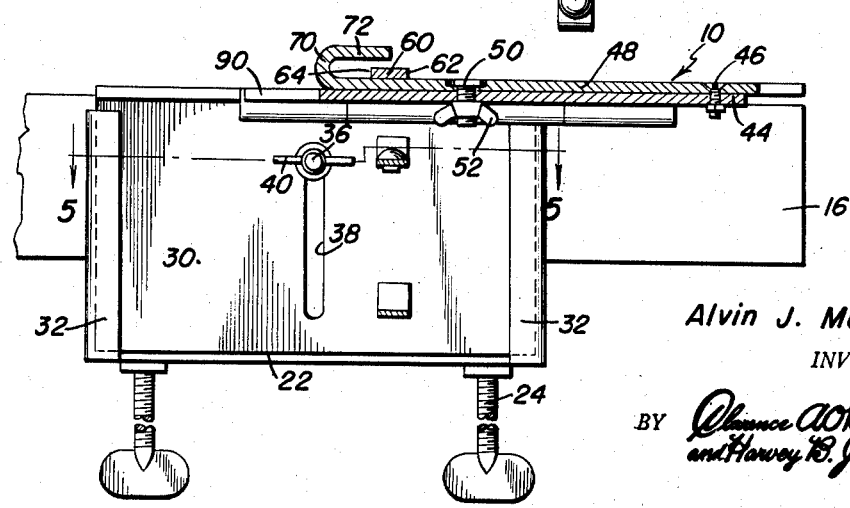
Alvin J. McCluskey
INVENTOR.
BY Clarence A. O'Brien
and Harvey B. Jackson
Attorneys Feb. 3, 1953
A. J. McCLUSKEY
2,627,287
PORTABLE POWER SAW GUIDE WITH AN
ADJUSTABLE AND TILTABLE PLATFORM
Filed Feb. 6, 1950
2 SHEETS—SHEET 2
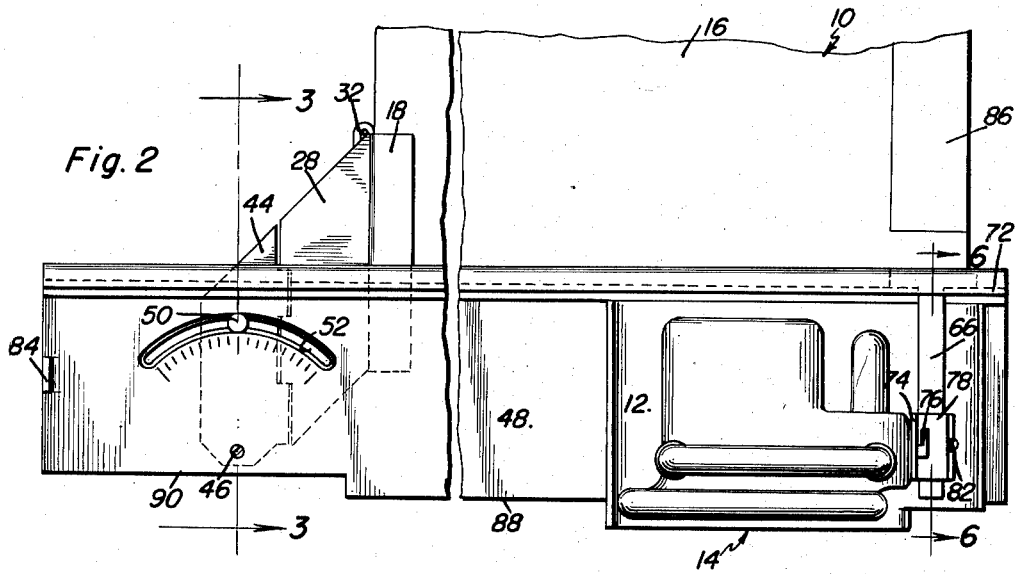
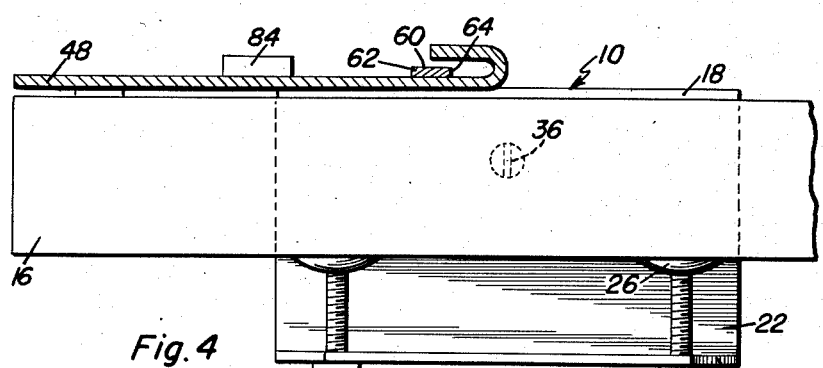
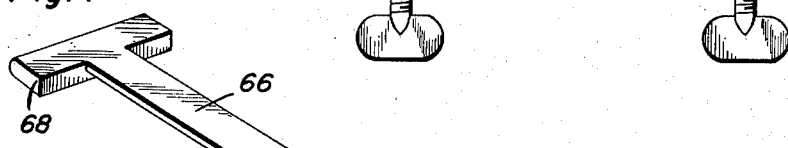
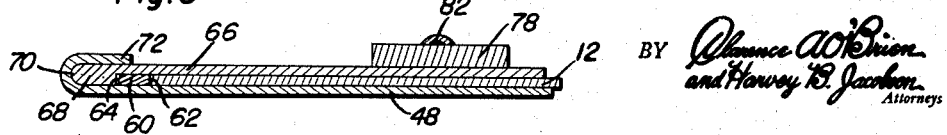
Alvin J. McCluskey
INVENTOR.
BY *Clarence A. O'Brien*
*and Harvey B. Jackson*
Attorneys Patented Feb. 3, 1953

2,627,287

UNITED STATES PATENT OFFICE 2,627,287

PORTABLE POWER SAW GUIDE WITH AN ADJUSTABLE AND TILTABLE PLATFORM

Alvin J. McCluskey, San Antonio, Tex.

Application February 6, 1950, Serial No. 142,635

7 Claims. (Cl. 143—6)

This invention comprises novel and useful improvements in guides, and more particularly pertains to guides for portable power saws, and the like.

An important object of this invention is to provide a guide for a portable power saw which will guidingly retain the stock to be cut in such a manner as to permit the stock to be readily inserted and removed from the device, and which will guide a saw through the stock in various predetermined directions.

Another object of this invention is to provide a guide for a portable power saw, which can be readily adapted to cut stock of varying thickness and to make cuts therein of varying predetermined depths.

A further object of this invention is to provide a guide for a portable power saw, in accordance with the foregoing objects, which is of simple construction yet durable and highly efficient for the purposes intended.

An important feature of this invention resides in the provision for a tiltable platform which is tiltable upwardly so as to permit the ready insertion and removal of the stock to be cut.

Another important feature of this invention resides in the provision for means for adjusting the vertical spacing of the saw guiding platform relative to the fixed base, so that stock of varying thickness, and cuts of varying depths can be readily made.

A further feature of this invention resides in the provision for an improved guide which will guide the carriage longitudinally of the platform, in such a manner as to prohibit vertical or lateral displacement of the carriage relative to the platform.

These, together with various ancillary objects and features are attained by this device, a preferred embodiment of which has been illustrated by way of example only in the accompanying drawings, wherein:

Figure 1 is a side elevational view of the portable power saw guide, the dotted lines showing the elevated position of the platform and saw relative to the base, providing the stock retaining and guiding enclosure therebetween;

Figure 2 is a top plan view of the portable saw guiding device shown attached to a base;

Figure 3 is a vertical sectional transverse view, taken substantially on the plane 3—3 of Figure 2, showing the improved saw carriage guide, and also showing the means for adjusting the platform relative to the base;

Figure 4 is a vertical sectional transverse view taken substantially on the plane 4—4 of Figure 1 showing the bracket which selectively locks the saw guiding device to a base;

Figure 5 is a horizontal sectional view taken substantially on the plane 5—5 of Figure 3, showing the vertically adjustable connection between the mounting bracket and the guide support;

Figure 6 is a vertical sectional transverse view taken substantially on the plane 6—6 of Figure 2 showing the details of the carriage guide; and Figure 7 is a perspective view of the carriage guide arm.

Referring now more specifically to the accompanying drawings wherein like numerals designate similar parts throughout the various views, it can be readily seen that there is provided a portable guide indicated generally by the numeral 10 which will adjustably guide a carriage 12, which carriage may conveniently consist of the base of a portable power saw 14 or the like.

In order to lend portability to the saw cutting device 10, and also to permit more compact storage thereof, the applicant has provided a clamping bracket whereby the device may be readily attached to a fixed base 16, which base may conveniently consist of a wooden plank or the like, suitably dimensioned so as to support thereon the stock to be cut. For this purpose, the applicant has provided a channel-shaped member having upper and lower legs 18 and 20, respectively, which legs are connected by a web 22. As is readily apparent from a consideration of Figures 1 and 4, screw-threadedly received in the lower leg 20 are the thumb screws 24 which are preferably provided with washers 26, or the like, on their upper ends. As is also apparent from a consideration of Figures 1 and 4, the base 16 may be selectively clamped between the upper leg 18 and the washer 26 of the thumb screw 24 so as to detachably secure the guiding device to the base. Obviously, the base 16 may be recessed in the corner adjacent the upper leg 18, so that the upper surface of that leg will be flush with the upper surface of the base.

Slidably and guidably attached to the web 22 of the channel-shaped bracket is an L-shaped support 28, which support, for reasons which will later become apparent, preferably consists of a horizontally extending arm 28 and a vertically extending arm 30. A convenient means for guiding the vertical arm 30 of the support relative to the web 22, as will be readily seen from a consideration of Figure 5, may consist of rearwardly turned portions 32 of the web 22, which form the channel 34, in which channel the vertical arm of the support is slidably retained. In order to selectively lock the vertical arm 30 relative to the web 22 in the various adjusted positions, there may be provided a bolt 36 which is preferably recessed in the web 22, and projects through a slot in the vertical arm 30 of the support, a wing nut 40 or the like threadedly engaging the bolt so as to selectively lock the members together. Hingedly attached to the horizontal arm 28 of the support, as by the pin 42, is a plate 44. As will later become apparent, the plate 44 and the horizontal arm 28 of the support are preferably so designed that when they are pivoted to each other so as to lie in a common plane they will form a body having the general shape of a parallelogram.

Pivotally attached to the plate 44, and preferably adjacent the corner which lies forward of the horizontally extending arm 28, as by the pivot pin 46, is a guide platform 48. Pivotal movement of the guide platform 48 relative to the plate 44 may conveniently be adjustably controlled by a bolt 50 which is receivable in the arcuate guide slot 52, which bolt selectively locks the platform to the plate 44 by means of a thumb screw 54 or the like. It can thus be seen that when the guiding device is clamped to a base 16 or the like, and a piece of stock which is to be cut is placed upon the base, the saw 14 which is guidably attached to the platform 48 can be guided in any predetermined direction by pivoting the platform 48 about the pin 46, and then selectively locking the same to the plate 44 by means of the locking bolt 50. As is more readily apparent from a consideration of Figure 1, pivoting of the platform 48 about the pin 42 will selectively raise the platform relative to the stock that is to be cut, so as to permit ready insertion and removal of that stock between the platform and the base 16, and will also permit the saw blade 56 of the saw 14 to cut a groove in a board which extends transversely thereof, the beginning and end of which groove may lie between the longitudinal edges of the stock. This is obviously desirable in certain types of cabinet making, wherein it is merely necessary to replace the saw blade 56, with dado blades or the like, and then raise and lower the platform as the saw is guided longitudinally thereof, so as to cut a recess therein, which recess does not necessarily have to extend across the complete face of the stock.

In order to positively limit the pivotal movement of the platform 48 relative to the base 16, there may be provided a stop bracket 58 which may conveniently be attached to the vertical arm 30 of the support, so as to be carried thereby, the stop bracket 58 projecting into the path of the downwardly pivoting platform 48 so as to prevent further tilting, from a predetermined angular deviation from the horizontal.

In order to rectilinearly guide the carriage 12 of the saw 14 relative to the platform 48, in such a manner as not to interfere with the cutting action of the saw, and also so as to readily accommodate saws of varying types and sizes, there is provided a guide rail 60, having inner and outer guide surfaces 62 and 64, respectively. The guide arm 66 overlies the rail 60 and has provided at one end a downwardly depending flange 68 which flange slidably engages the outer guide surface 64 of the rail 60. In order to retain the guide arm 66 and the flange 68 in engagement with the rail, the platform 48 may have the edge adjacent the rail 60 rolled, as at 70, so as to provide a guiding flange 72 which partially overlies the rail 60 in spaced relation thereto. As is more readily apparent from a consideration of Figure 6, the flange 68 on the guide arm 66 may be so constructed that it is complementary to the inner surface of the rolled edge 70 of the platform 48, thereby providing a double guiding surface, one between the outer guiding surface 64 of the rail 60, and the other within the rolled end 70 of the platform. The carriage 12 and the portable saw 14 are attached to the guide arm 66, preferably so as to be adjustable longitudinally thereof. For this purpose, there may be utilized the conventional bracket 74 which is attached to the carriage or to the saw as by bolt 76, or the like, which bracket has a horizontally extending portion 78 which preferably is attached to the upper surface of the carriage 12. A recessed slot 80 is provided in the horizontally extending portion 78, which slot extends transversely of the longitudinal axis of the carriage. The guide arm 76 is slidably received in the slot, and selectively locked to said carriage and said bracket 74, as by the thumb screw 82. It is intended that the carriage 12, when the saw 14 is in its normal position, will be guidingly and slidably received along the inner guide surface 62 of the rail 60, so as to provide an additional guide surface during the rectilinear sliding movement of the power saw 14. However, if, for any reason, it is deemed necessary to adjust the spacing of the carriage relative to the guide, this adjustment may be efficaciously accomplished by loosening the thumb screw 82 and adjusting the power saw 14 and carriage 12 relative to the guide arm 66.

As is believed readily apparent from a consideration of Figure 1, when the saw 14 and the carriage 12 are positioned on the platform 48 adjacent the rear end thereof to which the carriage stop 84 is secured, the weight of the power saw will serve to pivot the platform about the pin 42, permitting ready insertion or removal of the stock between the platform and the base 16.

A longitudinally extending notch 90 may conveniently be provided in the rear end of the platform 48 adjacent the edge 88 thereof, so as to permit the saw guard with which most saws are provided to fall into place when the saw 14 is positioned thereabove. Obviously, as the saw is pushed forward, the saw guide will ride over the top of the platform.

In operation, the power saw guide is attached to a base 16, by means of the channel-shaped clamp, and the vertical arm 30 of the support adjusted relative to the web 22 of the bracket, so as to vertically space the platform 48 which is attached to the horizontal arm 28 of the support a distance equal to the thickness of the stock that is to be cut. Obviously, the stock which is placed upon the base 16 may be either guided against the upwardly extending part of the vertical arm 30 of the support, or it may be independently guided longitudinally of the base, as by a guide 86 which is secured to, or formed as part of the base 16. The platform 48 is then tilted upwardly about the pin 42 as by shifting the weight of the power saw 14 to the end of the platform adjacent the carriage stop 84, or otherwise as is desired, so that the stock may be readily inserted between the platform and the base. The angle at which the stock is to be cut may be readily set by pivoting the platform 48 about the point 46, and then selectively locking the platform to the plate 44 by the bolt 50. For convenience, conventional indicia indicating the angular deviation of the platform 48 from the normal to the base 16 may be provided adjacent the slot 52. The stock which is placed below the platform 48 will then be cut by the power saw 14, along the edge 88 of the platform. Obviously, when the platform 48 is pivoted about the point 46 counter-clockwise, the horizontal arm 28 and the plate 44, if they were not shaped like a parallelogram as previously discussed, would lie in the path of cutting of the power saw, and consequently the particular shape of the plate 44 and the horizontally extending arm 28, as shown in Figure 2, has been found highly advantageous.

From the foregoing, it is believed that the operation and construction of the device will be readily understood. However, since numerous modifications will readily occur to those skilled in the art after a consideration of the foregoing specification and accompanying drawings, it is not desired to limit the invention to that shown and described, but all suitable modifications may be resorted to, falling within the scope of the appended claims.

Having described the invention, what is claimed as new is:

1. A carriage guide comprising a supporting platform, a rail attached to said platform and having inner and outer guide surfaces thereon, a guide arm attached to said carriage and overlying said rail, a flange on said arm slidably engaging said outer guide surface, said carriage slidably engaging said inner guide surface, and a guide flange on said platform and overlying said arm to retain said arm in guided engagement with said rail.

2. The combination of claim 1 wherein said carriage is adjustable longitudinally of said guide arm.

3. A portable saw guide and support comprising a bracket adapted to be detachably secured to a base, an L-shaped support having first and second legs, said first leg of said support being vertically adjustably attached to said bracket with said second leg extending horizontally, a plate hingedly attached to said second leg for vertical pivotal movement relative thereto, an elongated flat platform adjustably pivotally attached intermediate its ends to said plate for movement about an axis perpendicular to the plane of said platform, said second leg of said support underlying said platform and constituting a stop to limit downward swinging movement of said platform, and means slidably and guidably mounting a saw on said platform for movement rectilinearly thereof, said means including a rail attached to said platform having inner and outer guide surfaces thereon, a guide arm overlying said rail, a flange on said arm slidably engaging said outer guide surface, a saw carriage attached to said guide arm engaging said inner guide surface and a guiding flange on said platform overlying said arm to retain the arm in guided engagement with the rail.

4. The combination of claim 3 wherein said bracket is C-shaped, said first leg of said support being vertically adjustably attached to the web portion of said bracket, the legs of said bracket extending in a direction opposed to that in which said second leg extends to clamp a base therebetween.

5. The combination of claim 3 wherein said bracket is C-shaped, said first leg of said support being vertically adjustably attached to the web portion of said bracket, the legs of said bracket extending in a direction opposed to that in which said second leg extends to clamp a base therebetween, inwardly directed channel shaped guides on the web of said bracket, said first leg of said support being guidably received between said guides.

6. A portable saw guide and support comprising a bracket adapted to be detachably secured to a base, a vertically adjustable support attached to said bracket, a plate hingedly attached to said support for pivotal movement relative thereto about a horizontal axis, an elongated flat platform attached to said plate for adjustable angular movement about an axis perpendicular to the plane of said platform, a carriage attached to said platform for rectilinear guided movement relative thereto, a longitudinally extending rail attached to said platform and having inner and outer guide surfaces thereon, a guide arm attached to said carriage and overlying said rail, a flange on said arm slidably engaging said outer guide surface while said carriage engages said inner guide surface, and a guiding flange on said platform overlying said arm to retain said arm in guided engagement with said rail.

7. The combination of claim 6 wherein said bracket includes a channel-shaped member having adjusting means attached to a channel leg for urging a base into locking engagement with the other channel leg, guides attached to the web of said channel member transversely of said legs, said support being slidably received in said guides, means selectively locking said support to said bracket.

ALVIN J. McCLUSKEY.

REFERENCES CITED

The following references are of record in the file of this patent:

UNITED STATES PATENTS

| Number | Name | Date |
|---|---|---|
| 650,644 | Koeppen | May 29, 1900 |
| 1,457,492 | Bloodgood | June 5, 1923 |
| 1,601,610 | Carter | Sept. 28, 1926 |
| 1,618,341 | Howland | Feb. 22, 1927 |
| 1,706,115 | Hannah | Mar. 19, 1929 |
| 1,764,111 | Manthey | June 17, 1930 |
| 1,828,043 | Hedgpeth | Oct. 20, 1931 |
| 1,832,283 | Earhart | Nov. 17, 1931 |
| 2,502,640 | Coleman | Apr. 4, 1950 |